(12) United States Patent
Mäki-Ontto

(10) Patent No.: US 7,250,700 B2
(45) Date of Patent: Jul. 31, 2007

(54) ARRANGEMENT FOR PROTECTING AN ELECTRIC MACHINE

(75) Inventor: Petri Mäki-Ontto, Espoo (FI)

(73) Assignee: ABB Oy, Helsinki (FI)

( * ) Notice: Subject to any disclaimer, the term of this patent is extended or adjusted under 35 U.S.C. 154(b) by 0 days.

(21) Appl. No.: 10/532,130

(22) PCT Filed: Oct. 14, 2003

(86) PCT No.: PCT/FI03/00762

§ 371 (c)(1),
(2), (4) Date: Oct. 17, 2005

(87) PCT Pub. No.: WO2004/036721

PCT Pub. Date: Apr. 29, 2004

(65) Prior Publication Data

US 2006/0145560 A1    Jul. 6, 2006

(30) Foreign Application Priority Data

Oct. 21, 2002    (FI) ................... 20021879

(51) Int. Cl.
*H02K 3/34* (2006.01)
*H02K 5/10* (2006.01)

(52) U.S. Cl. .................. 310/68 R; 310/215

(58) Field of Classification Search .............. 310/196,
310/214, 215, 219, 220, 68 R; 174/110 SR,
174/120 R, 120 SC, 116–118, 127, DIG. 19,
174/DIG. 20, DIG. 26, DIG. 31, DIG. 33
See application file for complete search history.

(56) References Cited

U.S. PATENT DOCUMENTS

| | | | | |
|---|---|---|---|---|
| 4,308,476 A | * | 12/1981 | Schuler | 310/45 |
| 4,318,020 A | * | 3/1982 | Meyer | 310/215 |
| 4,831,295 A | | 5/1989 | Posedel | |
| 5,821,652 A | * | 10/1998 | Hyypio | 310/83 |
| 5,979,087 A | * | 11/1999 | Bell et al. | 310/254 |
| 6,720,692 B2 | * | 4/2004 | Bell | 310/85 |
| 6,756,712 B1 | | 6/2004 | Schüren | |
| 6,960,859 B2 | * | 11/2005 | Baumann et al. | 310/196 |
| 2001/0005106 A1 | | 6/2001 | Bell | |

FOREIGN PATENT DOCUMENTS

DE    199 48 145    6/2001

* cited by examiner

*Primary Examiner*—Tran Nguyen
(74) *Attorney, Agent, or Firm*—Buchanan Ingersoll & Rooney PC

(57) ABSTRACT

The object of the invention is an arrangement for an alternating-current machine that can be connected to an inverter and includes windings located in grooves and insulated from the plate core of the machine. According to the invention, an electrically conductive shield is fitted between the windings and the plate core, comprising a number of parallel strips. The strips are separated from each other and insulated from the plate core. The strips essentially extend over the length of the groove and are earthed or connected to the plate core.

9 Claims, 3 Drawing Sheets

ARRANGEMENT FOR PROTECTING AN ELECTRIC MACHINE

Figure 1:
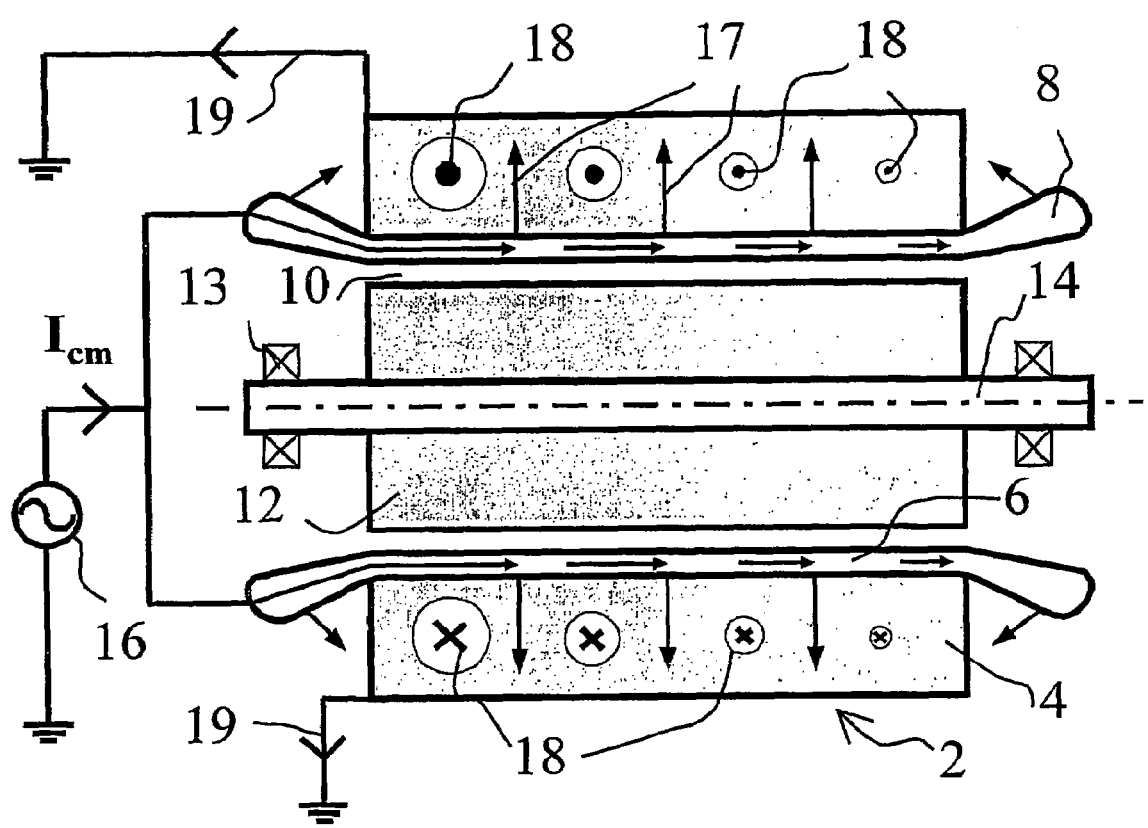

The object of the invention is an arrangement for an alternating-current machine that can be connected to an inverter according to the introduction part of claim 1.

In alternating-current machines connected to a frequency converter, the sharp-edged voltage pulses generated by the frequency converter cause a common-mode leak current in the machine from the windings to the plate core, creating a magnetic flux around the axle in the latter. The magnetic flux induces a so-called axle voltage in the loop formed by the axle, the bearings and the plate core. An axle voltage of sufficient magnitude causes a flashover and an electric current through the film of oil in the bearings. The flashover causes a spark phenomenon on the bearing surface and may lead to severe damage to the bearing after a very short period of use. The axle voltage may also cause sparks, which is not acceptable in explosive atmospheres. The common-mode current also causes the machine frame potential to increase, resulting in a risk of electric shock.

There have previously been many different attempts of reducing the disadvantages caused by common-mode leak current and the resulting bearing current. The output voltage of the frequency converter has been filtered using active and passive filters, and the rate of voltage increase in the frequency converter has been limited. Ceramic bearings have been proposed, and insulators have been adapted to the bearings. Furthermore, it has been proposed that the machine be equipped with an electrically conductive shield that is earthed and prevents common-mode current from shorting through the axle and bearing.

A prior art solution according to the latter alternative is known from the patent publication DE 19948145 C1, proposing that a shield made of electrically conductive metal plate be installed in the stator groove so that the plate is insulated from the stator plate core and winding. The plate is earthed or connected to the plate core at the end of the motor where the supply cables are connected. However, in addition to protecting the motor from bearing currents and their adverse effects, this type of solution also generates substantial additional losses.

The objective of the present invention is to provide efficient protection against common-mode currents circulating in an alternating-current machine connected to an inverter without sacrificing overall economy. This objective can be reached by means of the characteristics defined in the characteristics part of claim 1. With regard to other preferred embodiments of the invention, reference is made to the dependent claims.

The shield according to the invention efficiently prevents the current from penetrating into he plate core of the machine, thus eliminating the possibility for creating a magnetic flux circulating in the plate core, inducing an axle voltage and generating a bearing current. Thanks to its preferred structure, the current carried away by the shield does not create eddy-current losses to any detrimental extent.

According to a preferred alternative, there are strips formed of a continuous insulator-coated conductive plate with slits parallel to the machine axle, extending essentially over the entire length of the machine. Such a structure is easy to adapt to the bottom of the groove and particularly preferred when the winding is formed of conductors wound separately into the grooves. It is preferred to cover the edges of the groove with a few strips, but the bottom of the groove may be covered by a single strip.

Figure 3:
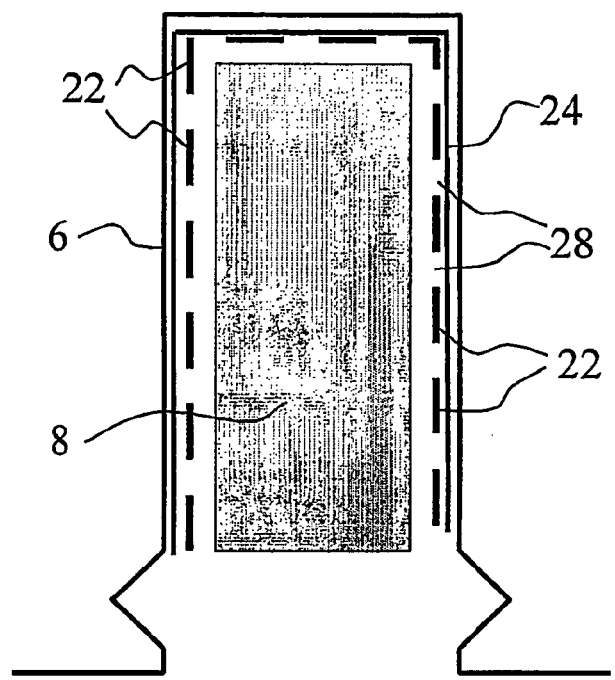
Figure 4:
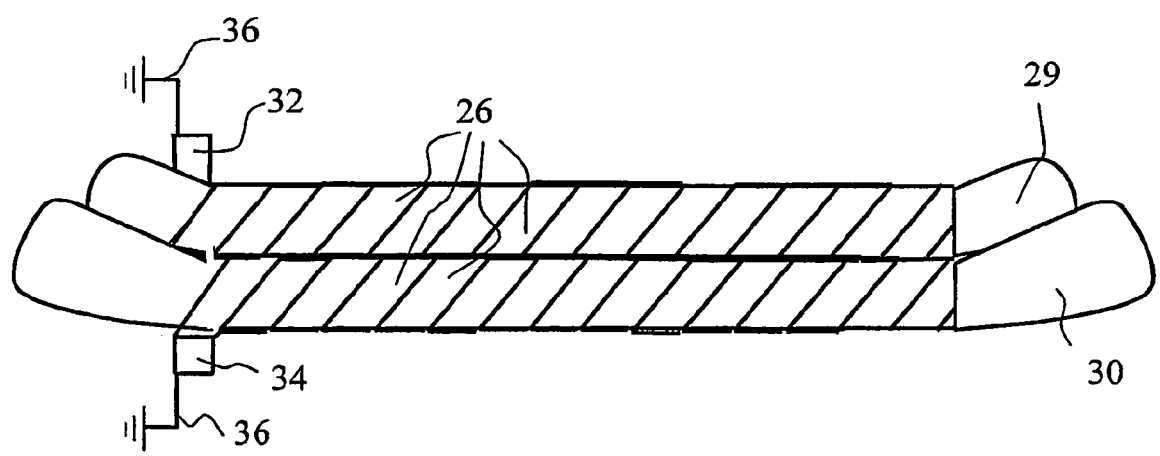

According to another preferred embodiment, conductive tape with an insulating layer is wound over the winding, essentially covering the entire length of the winding in the groove. This alternative is suitable for preformed windings fitted into the grooves in ready-made form. The shield surrounds the entire winding, providing excellent protection In the following, the invention will be described with the help of certain embodiments by referring to the enclosed drawings, where FIG. 1 is a cross-sectional view of the machine, illustrating the currents induced in the plate core, FIG. 2 illustrates the operation of a shield according to the invention FIG. 3 illustrates the adaptation of such a shield into the groove and FIG. 4 illustrates another shield according to the invention.

In a diagrammatical representation, the electric motor 2 comprises the stator plate core 4 with grooves 6 formed on its internal circumference; the windings 8 are fitted into these grooves. The rotor 12 is mounted inside the stator at the distance of the air gap 10, rotating on the axle 14 supported by the bearings 13. The motor is supplied by a frequency converter in a known manner, connected to the windings through the motor connectors. This is not described in more detail. The source of the high-frequency common-mode voltage in the frequency converter is indicated by the voltage source 16, from where current flows to the motor windings. High-frequency current leaks to the plate core by capacitive coupling through the winding insulation. In FIG. 1, the arrows 17 represent the current flowing through the plate core, and the current flows through the machine frame to earth, represented by the conductor 19. The common-mode current $I_{cm}$ flowing through the winding and the stator plate core induces a flux 18 around the stator in the stator plate core 4, a so-called circular flux, represented by a cross where the flux enters the plane of the figure and a point where it exits the plane of the figure. The flux 18 further induces a voltage in the circuit completed through the route from the stator plate core 4 to the bearings 13 and the axle 14. As the voltage induced by the flux 18 reaches a sufficiently large value, a flashover occurs in the firm of oil in the bearings and bearing current flows in the circuit formed by the axle 14, the bearings 13 and the plate core 4.

Figure 2:
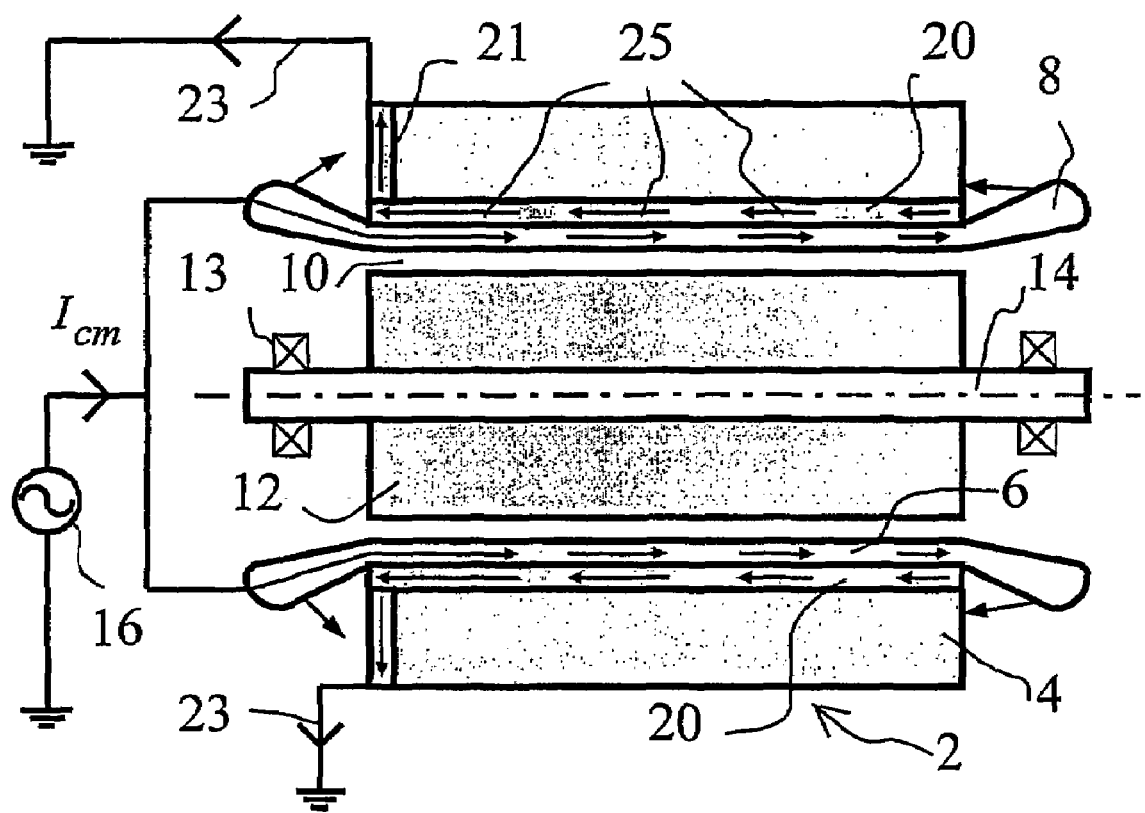

In FIG. 2, shields 20 of conductive material such as aluminium have been fitted in the stator grooves 6. It is preferred that the shield is manufactured from a film comprising an insulating layer and a conductive layer. The shield is relatively thin. A conductive layer thickness in the order of 0.1 mm is sufficient Even a structure with a conductive layer thickness in the order of 0.01 mm provides moderate protection. The insulating layer separates the film from the plate core; thus the conductive layer is separated from both the winding and the plate core. The shield is connected to earth through the conductive layer 21 and the conductor 23, or to the plate core at the end of the motor where the supply connectors are. In this case, the capacitive leak current caused by the high-frequency voltage pulses flows to earth through the shield and does not penetrate the stator plate core, illustrated in FIG. 2 by the arrows 25 in the shield 20 and the layers 21. This eliminates the circular flux and the bearing current induced by it.

Even though the above is a description of a machine operating as a motor, the same principle applies to a generator connected to the grid through a frequency converter.

Similarly, a conductive shield can be fitted to a groove in the rotor plate pack if voltage is fed to the rotor or if the machine has dual feeds.

As described above, the shield fitted between the winding and the plate core is formed of a layered structure with a conductive layer and an insulating layer. The conductive layer is made of aluminium, copper or a similar material with good electrical conductivity. The insulating layer is made of suitable plastic with sufficient insulating properties. However, the stray flux going through the shield generates eddy currents in the conductive layer, significantly adding to the machine's losses. The eddy currents can be reduced by making the conductive layer as thin as possible. However, as the conductive layer becomes thinner, its ability to suppress common-mode currents and thus eliminate bearing currents becomes weaker. A very preferred solution can be created by constructing the conductive layer of several parts fitted to the groove in parallel according to the invention.

FIG. 3 is a cross-sectional view of the groove 6, where the shield 20 is formed of six parallel conductive strips 22 in the depth of the groove and an insulating layer 24 between the conductive layer and the plate core. The shield is manufactured, for example, from insulating plate coated with a conductive layer where the conductive layer is removed from the parts 28 between the conductor strips 22 over the entire length of the groove, providing galvanic separation between the strips. FIG. 3 is not intended to illustrate any accurate dimensions of an implementation, just the principle. Thus a narrow slit is enough for creating the intended effect; the width of the slit depends on the dimensions of the machine and the associated voltage differences between the strips. At the end of the groove where the motor supply connectors are located, the conductive strips are connected to the earth conductor or the stator plate pack. It is preferred that this end of the shield contains a conductive layer area connecting the conductive strips 22 to each other; the area is thus connected to the conductive strips and the earth conductor.

The shield 20 can also be formed of separate strips with a conductive layer and an insulating layer. In this case, the conductive layers may also be overlapped so that there will be no empty area perpendicular to the wall or bottom of the groove. The insulating layer provides galvanic separation between the parallel conductive layers.

In an embodiment of the invention, the shield is formed as a ribbon or tape wound around the winding. According to FIG. 4, the ribbon 26 comprised of a conductive layer and an insulating layer is wound around the lower 29 and upper 30 formed windings over the entire length fitted into the groove. It is preferred that the shield has an adhesive layer on top of the conductive layer, enabling the shield to adhere to the winding. This embodiment is particularly well suited for form windings. At the supply connector end of the winding 32 and 34, the conductive layer is connected to the earth conductor 36 or the plate core. The other end of the conductive strip is open. This embodiment provides shield coverage for the winding over the entire area of the groove, and the protective effect is similar to that of a continuous shield. However, the strip-type structure prevents any additional motor losses.

In the above, certain preferred embodiments of the invention have been described. However, it is obvious to a person skilled in the art that the invention can be implemented in several other ways within the scope of the claims presented below.

The invention claimed is:

1. An arrangement for an alternating-current machine that can be connected to an inverter, said machine including windings located in grooves and insulated from the plate core of the machine, wherein an electrically conductive shield is fitted between the windings and the plate core, said shield comprising a number of parallel strips separated from each other and insulated from the plate core, extending essentially over the length of the groove, earthed or connected to the plate core.

2. An arrangement according to claim 1, wherein the shield is earthed at the end where the winding is connected.

3. An arrangement according to claim 1, wherein the shield is formed of axial strips galvanically separated from each other within the area of the groove.

4. An arrangement according to claim 1, wherein the conductive strip is aluminium.

5. An arrangement according to claim 1, wherein the thickness of the conductive strip is in the order of 0.1 mm.

6. An arrangement according to claim 1, wherein the electrically conductive strips are formed of a conductive layer on top of an insulating layer where the conductive layer is removed from strips essentially parallel to the groove.

7. An arrangement according to claim 1, wherein the electrically conductive strips essentially cover the bottom and walls of the groove.

8. An arrangement according to claim 1, wherein the conductive strips are connected to each other at the end of the groove by means of a conductive link that is further earthed or connected to the plate core.

9. An arrangement according to claim 1, wherein the shield is formed of a ribbon or tape comprising a conductive layer and an insulating layer, wound around the winding at least over the area of the winding fitted in the groove.

* * * * *